US008820148B2

(12) United States Patent
McCarvill

(10) Patent No.: US 8,820,148 B2
(45) **Date of Patent: *Sep. 2, 2014**

(54) EXTERNAL CASING FUNCTIONAL ACCESS PORT

(75) Inventor: John Roger McCarvill, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 943 days.

This patent is subject to a terminal disclaimer.

(21) Appl. No.: 12/948,391

(22) Filed: Nov. 17, 2010

(65) Prior Publication Data

US 2012/0119633 A1 May 17, 2012

(51) Int. Cl.
*G01M 15/14* (2006.01)

(52) U.S. Cl.
USPC .......................................................... 73/112.01

(58) Field of Classification Search
USPC ............... 73/112.01, 112.03, 114.16, 114.18, 73/114.19, 114.28, 114.29, 114.77
See application file for complete search history.

(56) References Cited

U.S. PATENT DOCUMENTS 3,690,775 A 9/1972 Cousins
3,779,081 A 12/1973 Holtzman
3,820,386 A 6/1974 Grikscheit et al.
3,889,528 A 6/1975 Grikscheit et al.
4,194,400 A 3/1980 Staff
4,296,629 A 10/1981 Vuyovich
4,661,695 A 4/1987 Mori et al.
4,753,109 A 6/1988 Zabler
4,815,276 A 3/1989 Hansel et al.
4,958,515 A 9/1990 Bruggen et al.
5,079,910 A 1/1992 Hirst et al.
5,115,636 A 5/1992 Zeiser
5,594,665 A 1/1997 Walter et al.
5,612,497 A 3/1997 Walter et al.
5,814,724 A 9/1998 Romkee
5,900,541 A 5/1999 Morris
7,555,932 B2 7/2009 Hirose et al.
7,581,520 B2 9/2009 Kern et al.
7,866,234 B2 1/2011 Smart et al.
8,246,298 B2 8/2012 Wilson
2006/0291998 A1 12/2006 Dube et al.
2008/0121021 A1 5/2008 Barke et al.
2009/0126472 A1 5/2009 Hirose et al.
2010/0011847 A1 1/2010 Slivon et al.

(Continued)

OTHER PUBLICATIONS

McCall, Office Action Communication for U.S. Appl. No. 12/948,408 dated Jul. 11, 2013, 8 pages.
McCall, Office Action Communication for U.S. Appl. No. 12/948,408 dated Dec. 4, 2012, 10 pages.

(Continued)

*Primary Examiner* — Eric S McCall
(74) *Attorney, Agent, or Firm* — Hoffman Warnick LLC; Ernest G. Cusick

(57) ABSTRACT

A functional access port in a machine casing, a machine having a functional access port, and a method of monitoring a machine via a functional access port are disclosed herein. In an embodiment, an access port is provided in the external casing of an industrial machine. The access port comprises a passageway through the external casing of the machine, providing access to an interior of the machine. The access port further includes a removable passageway cover for removably occluding the passageway. A location, a size, a shape, and an orientation of the passageway relative to the external casing are strategically selected in accordance with engineering and design requirements to provide access through the passageway to a desired location on the interior of the machine while the external casing is in place, with minimal to no disassembly of the casing.

12 Claims, 3 Drawing Sheets

(56) References Cited

U.S. PATENT DOCUMENTS

| | | | |
|---|---|---|---|
| 2010/0077844 | A1 | 4/2010 | Mori et al. |
| 2010/0171956 | A1 | 7/2010 | Sappey et al. |
| 2010/0215477 | A1 | 8/2010 | Wilsom |

OTHER PUBLICATIONS

McCall, Office Action Communication for U.S. Appl. No. 12/948,408 dated Apr. 30, 2013, 8 pages.

McCall, Notice of Allowance and Fees Due for U.S. Appl. No. 12/948,408 dated Jan. 14, 2014, 7 pages.

McCall, Office Action Communication for U.S. Appl. No. 12/948,408 dated Oct. 25, 2013, 5 pages.

EXTERNAL CASING FUNCTIONAL ACCESS PORT

CROSS REFERENCE TO RELATED APPLICATION

This patent application is related to commonly-assigned U.S. patent application Ser. No. 12/948,408, filed concurrently with this application.

BACKGROUND OF THE INVENTION

The disclosure relates generally to machines having an external casing. More particularly, the disclosure relates to inspection, repair, or maintenance of machines having an external casing with minimal to no disassembly.

Many types of industrial machines such as turbines include critical components which are encased within an external casing or shell. During the life cycle of a machine, these critical components require inspection, repair, or maintenance in order to maximize the lifespan of the parts and the machine as a whole. Traditionally, access to components for inspection, repair or maintenance has been obtained by removing the casing and disassembling the machine as needed. This process can be technically difficult, time consuming, labor intensive, and expensive. Disassembly of the machine incurs costs both in labor required to disassemble the machine and casing, and in non-productive down time for the machine. Disassembly of the casing of the machine also exposes moving parts of the machine thereby increasing the risk of incorporating unwanted foreign material as well as creating a potential hazard for operators.

BRIEF DESCRIPTION OF THE INVENTION

Described herein are techniques for providing access to internal components of a machine having an external casing without removing the casing or disassembling the machine.

A first aspect of the disclosure provides an access port for a machine. The access port comprises a passageway through an external casing of the machine, the passageway providing access to an interior of the machine; and a removable passageway cover for removably occluding the passageway; wherein a location, a size, a shape, and an orientation of the passageway relative to the external casing are strategically selected to provide access through the passageway to a desired location on the interior of the machine while the external casing is in place.

A second aspect of the disclosure provides a machine having an external casing, the machine including an access port in the external casing. The access port comprises a passageway through the external casing of the machine, the passageway providing access to an interior of the machine. The access port further includes a removable passageway cover for removably occluding the passageway; wherein a location, a size, a shape, and an orientation of the passageway relative to the external casing are strategically selected to provide access through the passageway to a desired location on the interior of the machine while the external casing is in place.

A third aspect of the disclosure provides a method of monitoring a machine having an external casing, the method comprising: identifying a desired location on an interior of the machine, wherein the desired location includes a feature of the machine that is known to require one of inspection, repair or maintenance; strategically selecting a location, a size, a shape, and an orientation for an access port in the external casing to facilitate access to the desired location while the external casing is in place; providing the access port in the external casing of the machine, the access port comprising a passageway through the external casing of the machine, the passageway further including a passageway cover for removably occluding the passageway; removing the passageway cover to provide access to the interior of the machine; and monitoring the machine through the access port while the external casing remains fully assembled.

BRIEF DESCRIPTION OF THE DRAWINGS

These and other aspects, advantages and salient features of the invention will become apparent from the following detailed description, which, when taken in conjunction with the annexed drawings, where like parts are designated by like reference characters throughout the drawings, disclose embodiments of the invention.

DETAILED DESCRIPTION OF THE INVENTION

At least one embodiment of the present invention is described below in reference to its application in connection with the operation of a turbomachine. Although embodiments of the invention are illustrated relative to a turbomachine in the form of a gas turbine, it is understood that the teachings are equally applicable to turbomachines and electric machines including, but not limited to, other types of turbines including steam turbines, wind turbines, wind turbine gear boxes, generators, aircraft engines, reciprocating engines, appliances, accessory bases, locomotive power train machines, healthcare machines such as MRI, CT, and x-ray machines, hydro turbine machines, electric motors, pumps, transformers, switchgears, and generator excitation equipment. However, it should be apparent to those skilled in the art that the present invention is likewise applicable to any suitable turbomachine and/or electric machine having an outer casing. Further, it should be apparent to those skilled in the art that the present invention is likewise applicable to various scales of the nominal size and/or nominal dimensions.

As indicated above, aspects of the invention provide a functional access port 10 in an external casing 16 of a machine 12, a machine 12 including an access port 10, and a method of monitoring machine 12 using the access port 10.

Figure 1:
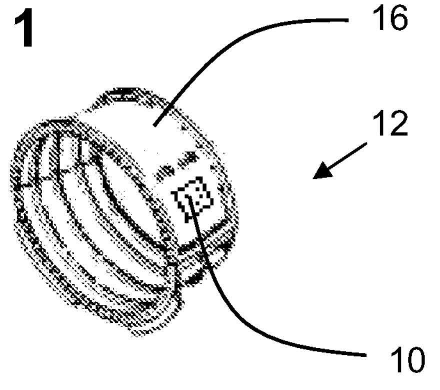
FIG. 1 shows an assembled view of an access port in a machine external casing according to an embodiment of the invention.
Figure 2:
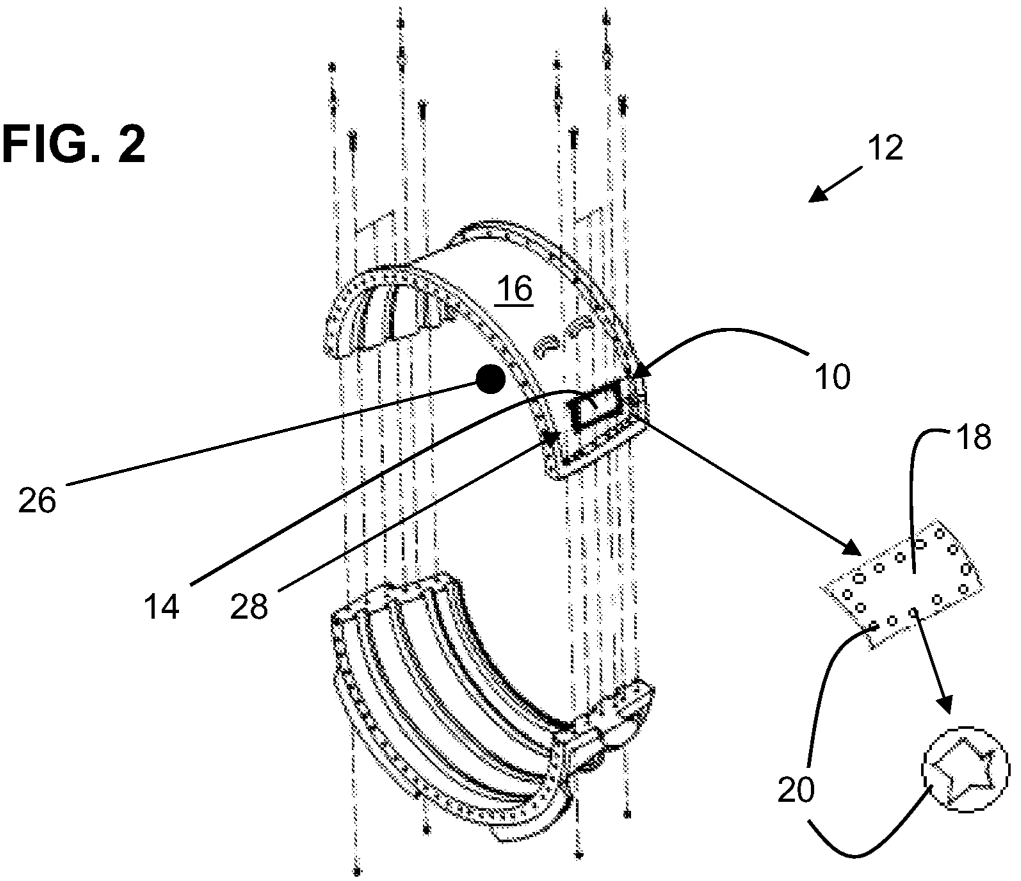
FIG. 2 shows an exploded view of an access port in a machine external casing according to an embodiment of the invention.

As shown in FIGS. 1-2, an access port 10 for a machine 12 may be provided. Access port 10 may include a passageway 14 through external casing 16 of machine 12. Passageway 14 provides access from an exterior side of casing 16 to an interior of machine 12. Access port 10 may further include a removable passageway cover 18 for removably occluding passageway 14. Cover 18 may be removed to gain access to an interior of machine 12, and may be replaced in passageway 14 in order to seal casing 16 of machine 12 when access is not required, and/or a seal on casing 16 is required.

Figure 3:
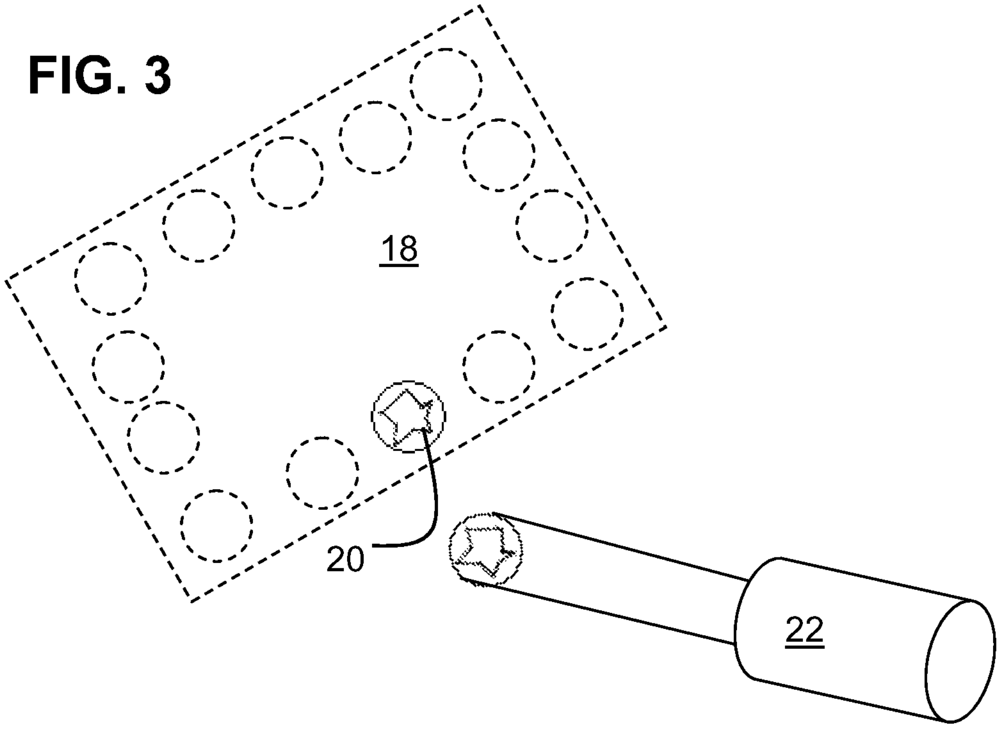
FIG. 3 depicts an access port cover in accordance with an embodiment of the invention.

Removable cover 18 may be secured to casing 16 of machine 12 by at least one fastener 20, shown in FIGS. 2-3. In an embodiment, a plurality of fasteners 20 may line the periphery of cover 18, however, various arrangements are also possible. In one embodiment, fastener 20 may be a bolt. In further embodiments, fastener 20 may be keyed such that a mated tool 22 of a unique and non-standard size and shape is required to insert, tighten, loosen and remove fastener 20 from cover 18 and casing 16. Tool 22, shown in FIG. 3, may further be unique to a specific machine, to a specific class of machine, or to a specific type of machine.

The placement, size, shape, and orientation of passageway 14 may vary widely, dependent upon the type of machine 12, the specific class within the type of machine 12, and the various engineering requirements appurtenant thereto. Regardless of the specific location, size, shape, and orientation of passageway 14 relative to the external casing 16, however, passageway 14 may be placed to provide access through passageway 14 to a desired location 26 on the interior of the machine 12 while external casing 16 is in place.

In one embodiment, machine 12 may be built and designed including an access port 10 that is original to machine 12. In another embodiment, an access port 10 may be created in an existing machine 12, thus retrofitting machine 12 with an access port 10 at a strategic location 28. The strategic location 28 for access port 10 may be determined based on engineering requirements to provide access to a desired location 26 on the interior of machine 12. The engineering requirements may include the feasibility of identifying a continuous path between access port 10 and the desired location 26. A machine 12 may have a single access port 10 or may have several access ports 10, providing access to one or more desired locations 26 on an interior of machine 12. One method of determining the feasibility of such a continuous path between a desired location 26 and a potential location 28 of access port 10 may be to insert a probe operably connected to a flexible cable into a passage such as an air cooling passage in machine 12.

In various embodiments, the strategic location 28 on machine 12 for port 10 may be selected according to various requirements of machine 12. In some embodiments, access port 10 may be positioned to afford access to a desired location 26 on an interior of machine 12, where the desired location 26 is a location known to have one of an inspection requirement, a maintenance and/or a repair requirement, or any combination of the three. Identification of a desired location 26 may be based on product service feedback and data for the same or a similar model machine 12, such that a desired location 26 may be identified in a location where issues, problems, and a need for inspection, maintenance and/or repair work have been reported frequently. Identification of strategic location 28 will be largely dictated by engineering requirements for providing access to desired location 26 through casing 16.

Figure 4:
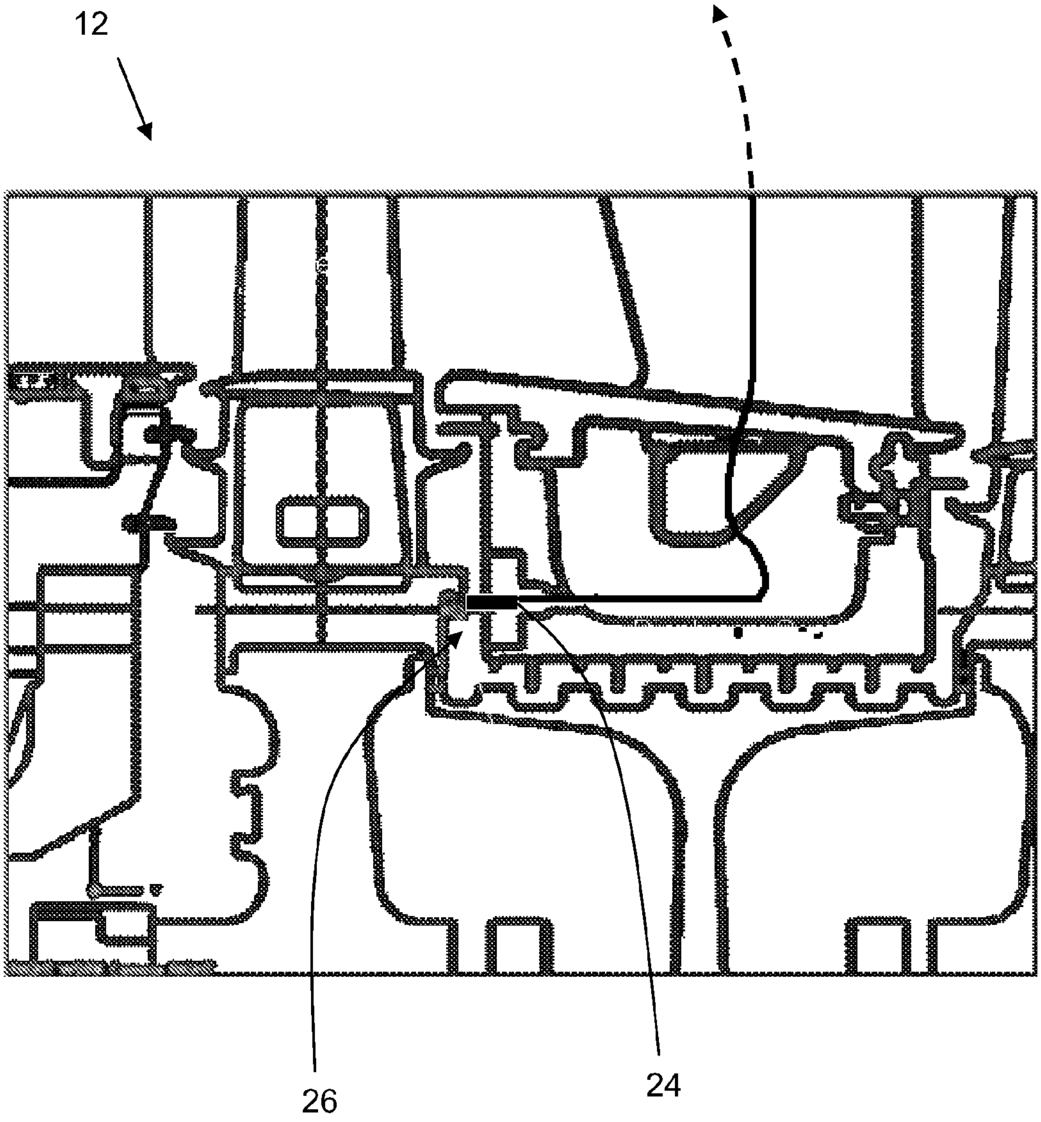
FIG. 4 depicts a cross section of a machine in accordance with an embodiment of the invention.

As shown in FIG. 4, a tool insert 24, which is insertable into access port 10, may further be provided. Tool insert 24 may be sized and dimensioned such that it may be inserted into access port 10 when removable passageway cover 18 is removed. Tool insert 24 may further be secured to external casing 16 of machine 12 by at least one fastener 20. Thus, when machine 12 requires inspection or repair at desired location 26, cover 18 may be removed from passageway 14 using tool 22, and tool insert 24 may be inserted into passageway 14 and affixed to casing 16 using fasteners 20. In one embodiment, tool insert 24 may include an inspection tool. In a further embodiment, tool insert may include a repair tool.

Also provided is a method for monitoring a machine 12 having an external casing 16. The method includes identifying a desired location 26 on an interior of machine 12, wherein the desired location 26 includes a feature of machine 12 that is known to require inspection, repair, or both over the life of machine 12. Different types of machines 12, and different classes within types of machines 12 may each have different such features and locations 26.

A location 28, size, shape, and orientation may then be selected for the strategic placement of access port 10 in casing 16 of machine 12. The location 28, size, shape, and orientation of access port 10 may facilitate access to the desired location 26 while external casing 16 is in place and machine 12 is fully assembled. Access port 10 is then provided in the external casing 16. Access port 10 comprises a passageway 14 through casing 16. A removable passageway cover 18 is further provided for removably occluding passageway 14, and removably sealing casing 16. Passageway cover 18 may be held in place by removable fasteners 20.

Cover 18 may be removed from passageway 14, providing access to the interior of machine 12. Tool insert 24 may be inserted into passageway 14 and affixed to casing 16 using fasteners 20. Tool insert 24 may facilitate monitoring machine 12 through access port 10 while external casing 16 remains fully assembled and intact. Such monitoring may include performing non-destructive inspections, repairs, or both.

Non-destructive inspections may be valuable in a variety of different machine applications, and may assist in determining when repairs need or need not be completed. The following embodiments are intended only to be exemplary, and are not intended to be limiting.

In one embodiment, a desired location 26 for inspection and potential repair via access port 10 may include a moving and/or rotating component such as, for example, a blade in a compressor of a gas turbine. Compressor blades may fail as a result of blade root failure, foreign objects, or cracks in the blade or root; a non-destructive inspection may provide information about the condition of the blades to inform a decision as to repair needs. Further, access port 10 may facilitate inspection and repairs including compressor blade tip grinding, blade/leading edge inspection and repair, blade fouling deposit testing and cleaning, and tooling to repair or replace damaged or out of life internal components of machine 12.

In another embodiment, structural features such as throughbolts, support fits for nozzles, dovetails and other components, struts for casings, mounting points or mounting locations, wear couples, and other components may be a desired location 26 for inspection or repair. In another embodiment, machine 12 may be a turbine, and the desired location 26 may be a stationary component such as, for example, a stator exit guide vane. It is noted that desired location 26 may be any of a number of other stationary or moving/rotating components. Still other desired locations 26 may include lock wires/tabs in any of a number of types of machines 12, and in a hot section of a combustion/gas turbine, the turbine wheel may require inspection and/or repair to ensure that, e.g., dovetail components maintain structural integrity over the course of temperature cycling and use. In another embodiment, in which machine 12 is a turbomachine, tool insert 24 may be a repair tool which may be used to facilitate the radially outward removal of at least one blade and a radially inward insertion of at least one replacement blade through access port 10.

Depending on the location 28 of the access port and the position of the desired location 26 being inspected and/or repaired, inspection and repair may take place either while machine 12 is offline or while machine 12 is in use. In any event, access port 10 may provide the ability to conduct non-destructive inspections and repairs with little to no disassembly of the machine 12 unit, resulting in minimal down time and improved efficiency. Access port 10 may further facilitate the insertion of monitoring devices which may provide data on an ongoing basis as to various operating conditions and parameters.

In another embodiment, a method is provided, performing the foregoing method steps on a subscription, contractual service agreement, and/or fee basis. That is, a service provider could offer to monitor a machine 12. In this case, the service provider can create, maintain, support, etc., tool insert 24, and/or create access ports 10 in machines 12 for monitoring as described above. Such monitoring may be done on a periodic basis, either based on working hours of the machine 12 or passage of time. In return, the service provider can receive payment from the customer(s) under a subscription and/or fee agreement. Such a service may be offered for machines 12 which may be retrofitted with access ports 10 for the purpose of such monitoring, or new machines designed with access port 10 original to the structure.

As used herein, the terms "first," "second," and the like, do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 mm, or, more specifically, about 5 mm to about 20 mm," is inclusive of the endpoints and all intermediate values of the ranges of "about 5 mm to about 25 mm," etc.).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An access port for a turbomachine, the access port comprising:

- a passageway through an external casing of the turbomachine;
- a removable passageway cover for removably occluding the passageway,
  - wherein a location, a size, a shape, and an orientation of the passageway relative to the external casing are strategically selected to provide access through the passageway to a desired location on an interior of the turbomachine while the external casing is in place; and
- a tool insert for the access port, wherein the tool insert is sized and dimensioned to be inserted into the access port when the removable passageway cover is removed, such that the tool insert and the removable passageway cover are interchangeably and alternatively inserted into the passageway,
- wherein when inserted into the access port, the tool insert or the removable passageway cover is secured to the external casing of the turbomachine by a bolt,
- wherein a head of the bolt is keyed such that a mated tool of a non-standard size and a non-standard shape is required to remove the bolt, and
- wherein the tool insert further comprises a repair tool, the repair tool being configured to radially outwardly remove at least one turbomachine blade and radially inwardly insert at least one replacement turbomachine blade through the access port.

2. The access port of claim 1, wherein the mated tool is unique to one of an individual turbomachine, a class of turbomachine, and a type of turbomachine.

3. The access port of claim 1, wherein the desired location on the interior of the turbomachine is a location known to have one or more of an inspection requirement, a maintenance requirement, and a repair requirement.

4. A turbomachine having an external casing, the turbomachine comprising:

- an access port in the external casing, the access port comprising a passageway through the external casing of the machine, the passageway providing access to an interior of the turbomachine;
- a removable passageway cover for removably occluding the passageway,
  - wherein a location, a size, a shape, and an orientation of the passageway relative to the external casing are strategically selected to provide access through the passageway to a desired location on the interior of the turbomachine while the external casing is in place,
  - wherein the desired location on the interior of the turbomachine is at least one of:
    - a rotating component of the turbomachine;
    - a lock wire/tab; and
    - a dovetail component; and
- a tool insert for the access port which is sized and dimensioned to be inserted into the access port when the removable passageway cover is removed,
- wherein the tool insert is secured to the external casing of the turbomachine by at least one fastener, and
- wherein the tool insert further comprises a repair tool, the repair tool being configured to radially outwardly remove at least one turbomachine blade and radially inwardly insert at least one replacement turbomachine blade through the access port.

5. The turbomachine of claim 4, wherein the desired location on the interior of the turbomachine is a location known to have one or more of an inspection requirement, a maintenance requirement, and a repair requirement.

6. The turbomachine of claim 4, wherein the turbomachine is one of a gas turbine, a steam turbine, a wind turbine, generator, an aircraft engine, and a hydro turbine machine.

7. The turbomachine of claim 4, wherein the turbomachine includes two or more access ports.

8. The turbomachine of claim 4, wherein the removable passageway cover is secured to the external casing of the turbomachine by at least one fastener.

9. The turbomachine of claim 8, wherein the at least one fastener comprises a bolt, and wherein a head of the bolt is keyed such that a mated tool of a non-standard size and a non-standard shape is required to remove the bolt.

10. The turbomachine of claim 9, wherein the mated tool is unique to one of an individual turbomachine, a class of turbomachine, and a type of turbomachine.

11. A method of monitoring a turbomachine having an external casing, the method comprising:

identifying a desired location on an interior of the turbomachine, wherein the desired location includes a feature of the turbomachine that is known to require one of inspection or repair;

selecting a location, a size, a shape, and an orientation for an access port in the external casing to facilitate access to the desired location while the external casing is in place;

providing the access port in the external casing of the turbomachine, the access port comprising a passageway through the external casing of the turbomachine, the passageway further including a passageway cover for removably occluding the passageway;

removing the passageway cover to provide access to the interior of the turbomachine; and performing a repair on the turbomachine through the access port while the external casing remains fully assembled, wherein the repair further comprises a radially outward removal of at least one blade and a radially inward insertion of at least one replacement blade through the access port.

12. The method of claim 11, wherein the providing the access port further comprises retrofitting the turbomachine with the access port to facilitate access to the desired location while the external casing is in place, wherein the location, the size, the shape, and the orientation for the access port are selected based on engineering requirements to provide access to the desired location on the interior of the turbomachine.

* * * * *

UNITED STATES PATENT AND TRADEMARK OFFICE

CERTIFICATE OF CORRECTION

PATENT NO. : 8,820,148 B2
APPLICATION NO. : 12/948391
DATED : September 2, 2014
INVENTOR(S) : McCarvill It is certified that error appears in the above-identified patent and that said Letters Patent is hereby corrected as shown below:

In the Claims
In Column 6, Line 53, in Claim 6, delete “generator,” and insert -- a generator, --, therefor.

Signed and Sealed this
Eighth Day of December, 2015

Michelle K. Lee
*Director of the United States Patent and Trademark Office*